US012248265B2

(12) United States Patent
Kawasaki

(10) Patent No.: US 12,248,265 B2
(45) Date of Patent: Mar. 11, 2025

(54) IMAGE FORMING APPARATUS, COST CALCULATION METHOD, AND RECORDING MEDIUM

(71) Applicant: KONICA MINOLTA, INC., Tokyo (JP)

(72) Inventor: Tetsu Kawasaki, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/316,341

(22) Filed: May 12, 2023

(65) Prior Publication Data

US 2023/0384724 A1 Nov. 30, 2023

(30) Foreign Application Priority Data

May 31, 2022 (JP) ................................. 2022-088137

(51) Int. Cl.
*G03G 15/00* (2006.01)

(52) U.S. Cl.
CPC ..... *G03G 15/5029* (2013.01); *G03G 15/5012* (2013.01); *G03G 15/5066* (2013.01); *G03G 15/5075* (2013.01); *G03G 15/6517* (2013.01); *G03G 2215/00105* (2013.01); *G03G 2215/00561* (2013.01)

(58) Field of Classification Search
CPC .. G03G 15/502; G03G 15/6508; G03G 21/00; G03G 15/5029; G03G 15/55; G03G 15/6517; G03G 2215/00734
See application file for complete search history.

(56) References Cited

U.S. PATENT DOCUMENTS

| | | | | |
|---|---|---|---|---|
| 5,162,847 | A * | 11/1992 | Watanabe | G03G 21/02 399/82 |
| 2016/0334744 | A1* | 11/2016 | Nogami | G06F 3/121 |
| 2019/0384550 | A1* | 12/2019 | Ochs | G06F 3/1208 |
| 2020/0406643 | A1* | 12/2020 | Komazawa | G03G 15/5016 |

FOREIGN PATENT DOCUMENTS

JP 2015170216 A 9/2015

* cited by examiner

*Primary Examiner* — Jessica L Eley
(74) *Attorney, Agent, or Firm* — Buchanan Ingersoll & Rooney PC

(57) ABSTRACT

An image forming apparatus, including: an image former that forms an image on continuous form paper; and a hardware processor that calculates a paper cost for a print job of the continuous form paper, on the basis of a distance of the continuous form paper conveyed from a start to an end of the print job.

12 Claims, 6 Drawing Sheets

IMAGE FORMING APPARATUS, COST CALCULATION METHOD, AND RECORDING MEDIUM

CROSS-REFERENCE TO RELATED APPLICATIONS

The entire disclosure of Japanese Patent Application No. 2022-088137 filed on May 31, 2022 is incorporated herein by reference in its entirety.

TECHNICAL FIELD

The present invention relates to an image forming apparatus, a cost calculation method, and a program.

DESCRIPTION OF THE RELATED ART

For printing companies, the cost for completing each print job is useful information as a material for considering break-even and a cost reduction method when accepting future orders.

As an example of a method for calculating the cost of the print job, a configuration is disclosed in which the cost is calculated on the basis of a printing distance of roll paper and the consumed amount of consumable items (for example, refer to JP 2015-170216 A).

SUMMARY OF THE INVENTION

However, unlike cut paper, in the case of the roll paper, the paper conveyed until the rising/falling (feeding speed stabilization) of a conveyance motor when stopping/starting paper conveyance is wasted paper, and thus, the cost varies in accordance with a stop frequency during the print job.

The configuration described in JP 2015-170216 A described above is based on the printing distance of the roll paper, and thus, the cost of the paper that is consumed until the feeding speed is stabilized or the paper that is consumed not in the job printing, such as adjustment, in the roll paper printing is not considered, and there is a problem that it is not possible to grasp an accurate job printing cost including the entire workflow.

An object of the present invention is to provide an image forming apparatus, a cost calculation method, and a program in which it is possible to grasp an accurate job printing cost including the entire workflow.

To achieve at least one of the abovementioned objects, according to an aspect of the present invention, an image forming apparatus reflecting one aspect of the present invention includes:

an image former that forms an image on continuous form paper; and a hardware processor that calculates a paper cost for a print job of the continuous form paper, on the basis of a distance of the continuous form paper conveyed from a start to an end of the print job.

To achieve at least one of the abovementioned objects, according to an aspect of the present invention, a cost calculation method reflecting one aspect of the present invention is a cost calculation method of an image forming apparatus including an image former that forms an image on continuous form paper, the cost calculation method including:

allowing a hardware processor to calculate a paper cost for a print job of the continuous form paper, on the basis of a distance of the continuous form paper conveyed from a start to an end of the print job.

To achieve at least one of the abovementioned objects, according to an aspect of the present invention, a recording medium reflecting one aspect of the present invention is a non-transitory recording medium storing a computer readable program for allowing a computer of an image forming apparatus including an image former that forms an image on continuous form paper to calculate a paper cost for a print job of the continuous form paper, on the basis of a distance of the continuous form paper conveyed from a start to an end of the print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

Figure 1:
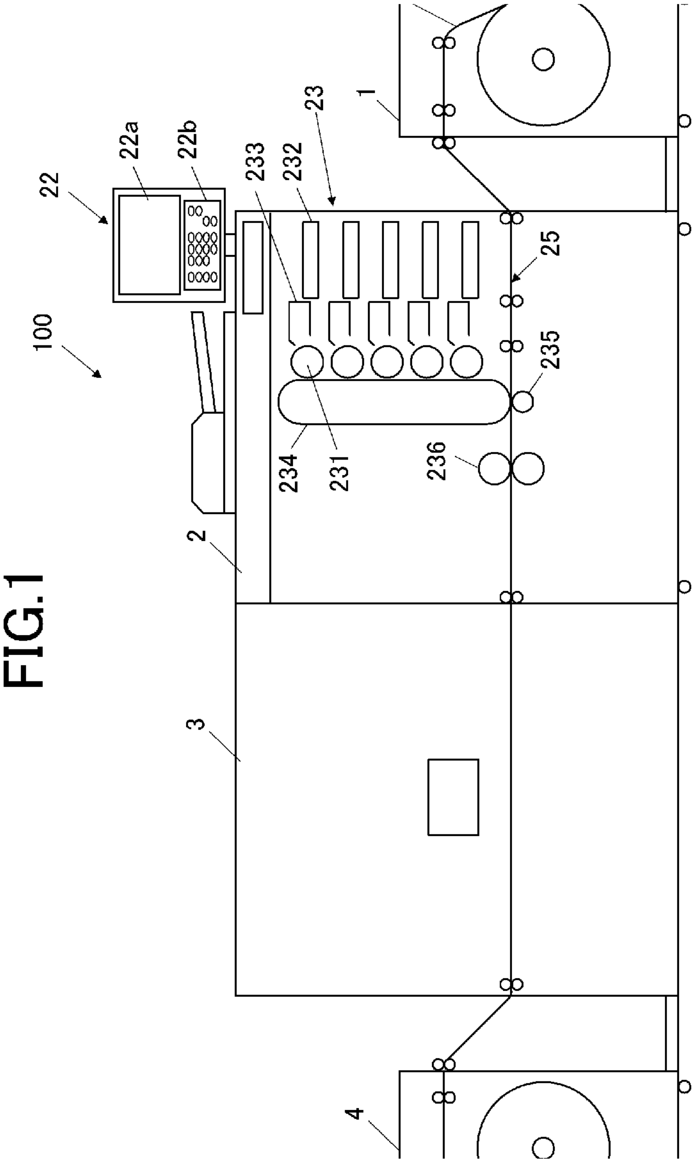
FIG. 1 is a front view illustrating a schematic configuration of an image forming system according to this embodiment.

As illustrated in FIG. 1, an image forming system 100 according to this embodiment includes a paper feeder 1, an image forming apparatus 2, an image inspection apparatus 3, and a winder 4.

The paper feeder 1, for example, contains continuous form paper PM such as roll paper or continuous stationery, and feeds the continuous form paper PM to the image forming apparatus 2. In the housing of the paper feeder 1, the roll-shaped continuous form paper PM is wound around a support shaft and is retained to be rotatable.

The image forming apparatus 2 forms an image on the continuous form paper PM fed from the paper feeder 1.

The image inspection apparatus 3 reads the image formed on the continuous form paper PM by the image forming apparatus 2, analyzes the read image, and detects a waste.

The winder 4 winds up the continuous form paper PM conveyed from the image inspection apparatus 3. In the housing of the winder 4, the continuous form paper PM is wound around a support shaft and is retained in the shape of a roll.

Figure 2:
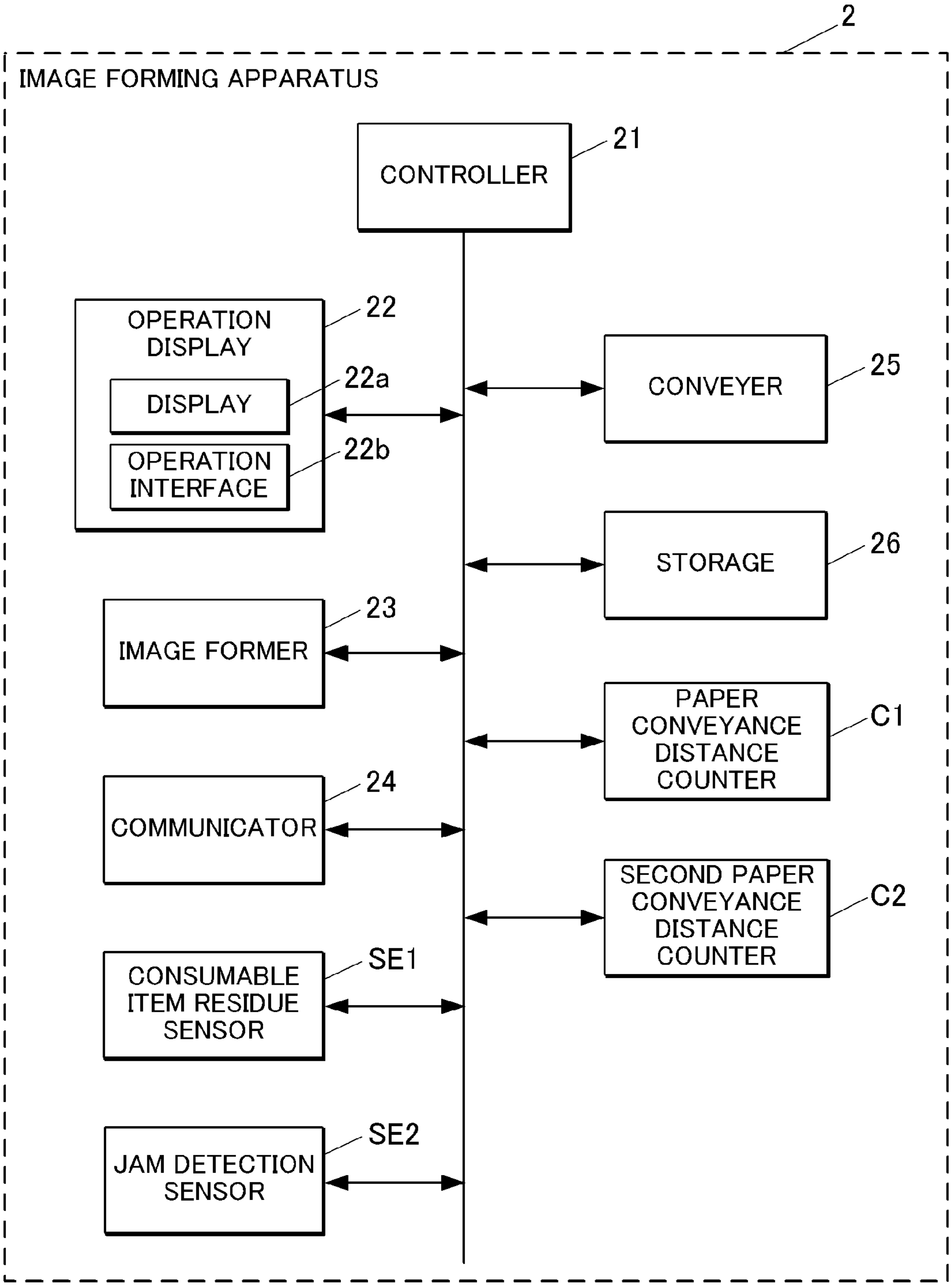
FIG. 2 is a functional block diagram illustrating a control structure of an image forming apparatus.

As illustrated in FIG. 1 and FIG. 2, the image forming apparatus 2 includes a controller (hardware processor) 21, an operation display 22, an image former 23, a communicator 24, a conveyer 25, a storage 26, a paper conveyance distance counter C1, a second paper conveyance distance counter C2, a consumable item residue sensor SE1, and a JAM detection sensor SE2.

The controller 21 includes a CPU, a RAM, and the like. The CPU of the controller 21 reads out various programs stored in the storage 26, such as a system program and a processing program, decompresses the programs in the RAM, and executes various processing pieces in accordance with the decompressed programs.

The operation display 22 includes a display 22*a* and an operation interface 22*b*.

The display 22*a* includes a liquid crystal display (LCD) and the like, and displays various screens in accordance with an instruction of a display signal input from the controller 21.

The operation interface 22*b* includes various function keys, and a touch panel formed to cover the display screen of the display 22*a*, and receives various operations from a user.

The image former 23 forms an image on the continuous form paper PM conveyed by the conveyer 25, in accordance with electrophotography.

The image former 23 includes five sets of photoreceptors 231, exposurers 232, developers 233, intermediate transfer belts 234, transfer rollers 235, and fixers 236 corresponding to each color component of yellow (Y), magenta (M), cyan (C), black (K), and a special color (S).

The surface of the photoreceptor 231 is electrified to a predetermined potential with predetermined polarity by applying an electrification bias voltage.

The exposurer 232 applies laser light with a predetermined exposure amount onto the electrified photoreceptor 231 to be exposed, and forms an electrostatic latent image on the photoreceptor 231.

The developer 233 supplies a toner of predetermined color (Y, M, C, K, and S) onto the exposed photoreceptor 231 by a development roller, and the electrostatic latent image formed on the photoreceptor 231 is developed by applying a development bias voltage.

A toner image (a monochromatic image) of each color formed on the photoreceptor 231 corresponding to each color of Y, M, C, K, and S is sequentially transferred onto the intermediate transfer belt 234, and a toner image (a color image) is formed in which a layer of each color is superimposed. The intermediate transfer belt 234 is an endless belt wound around a plurality of rollers. Then, the toner image formed on the intermediate transfer belt 234 is transferred onto the continuous form paper PM by applying a transfer bias voltage with a polarity opposite to that of the toner onto the transfer roller 235.

The fixer 236 fixes the toner image transferred onto the continuous form paper PM onto the continuous form paper PM by heating and pressurization.

The communicator 24 transmits and receives data with respect to an external device such as a PC that is connected through a communication network such as a local area network (LAN). The communicator 24, for example, receives a job including image data for printing from the external device.

The conveyer 25 is a conveyance member of the continuous form paper PM. The conveyer 25 conveys the continuous form paper PM fed from the paper feeder 1 to the image former 23 by the plurality of rollers, and conveys the continuous form paper PM that has passed through the image former 23 to the image inspection apparatus 3.

The storage 26, for example, includes a hard disk drive (HDD), a semiconductor non-volatile memory, and the like. In the storage 26, various programs such as the system program or the processing program executed by the controller 21, and data required to execute such programs are stored. In addition, the storage 26 stores a paper cost for a print job of the continuous form paper PM for each factor. Accordingly, the controller 21 is capable of managing the paper cost for the print job of the continuous form paper PM for each factor. The factor, for example, includes an adjustment operation, valid output, main printing, a paper conveyance speed stabilization operation, and the like.

The paper conveyance distance counter C1 is a counter that measures a conveyance distance of the continuous form paper PM.

The second paper conveyance distance counter C2 is a counter that measures the conveyance distance of the continuous form paper PM, separately from the paper conveyance distance counter C1, in a predetermined case (for example, at the time of consumable item resupply, JAM recovery, and the like).

The consumable item residue sensor SE1 is a sensor for detecting the residue of a consumable item (for example, a toner or the like). When the shortage of the consumable item is detected, the consumable item residue sensor SE1 outputs information indicating that the shortage of the consumable item is detected to the controller 21.

The JAM detection sensor SE2 is a sensor for detecting the occurrence of JAM. When the occurrence of JAM is detected, the JAM detection sensor SE2 outputs information indicating that the occurrence of JAM is detected to the controller 21.

Figure 3:
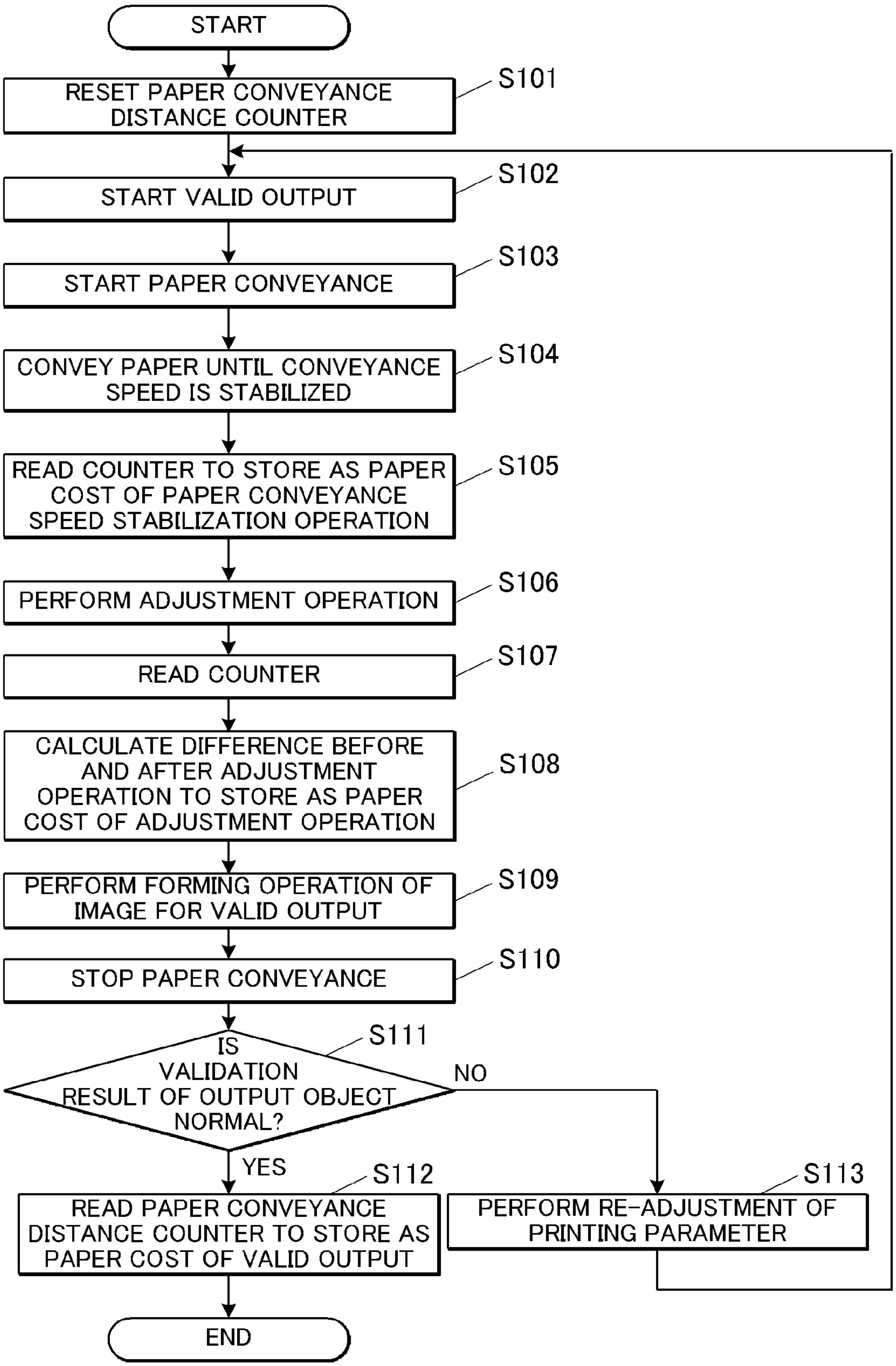
FIG. 3 is a flowchart illustrating an operation at the time of valid output performed by the image forming system according to this embodiment.

Next, the operation of the image forming system 100 according to this embodiment will be described with reference to flowcharts in FIG. 3 and FIG. 4.

First, an operation at the time of the valid output that is performed by the image forming system 100 will be described with reference to FIG. 3. The valid output is processing of outputting an image for valid output to the paper in order to validate whether image formation is normally performed, before performing the main printing of the print job.

First, the controller 21 resets the value of the paper conveyance distance counter C1 (set to 0) (step S101).

Next, the controller 21 starts the valid output of the print job (step S102).

Next, the controller 21 allows the conveyer 25 to start the conveyance of the paper (the continuous form paper PM) (step S103).

Next, the controller 21 conveys the paper until the conveyance speed of the paper is stabilized (step S104).

Next, the controller 21 reads the value of the paper conveyance distance counter C1 at a timing when the conveyance speed of the paper is stabilized, and stores the value in the storage 26 as the paper cost of the paper conveyance speed stabilization operation (step S105).

Next, the controller 21 allows the image former 23 to perform the adjustment operation (for example, patch output, output patch read-in, and the like) (step S106).

Next, the controller 21 reads the value of the paper conveyance distance counter C1 at a timing when the adjustment operation is ended (step S107).

Next, the controller 21 calculates a difference between the values of the paper conveyance distance counter C1 before and after the adjustment operation (that is, a difference between the value read at a timing when the adjustment operation is ended in step S107 and the value read when the conveyance speed of the paper is stabilized in step S105), and stores the difference in the storage 26 as the paper cost of the adjustment operation (step S108).

Next, the controller 21 allows the image former 23 to perform a forming operation of the image for valid output (step S109).

Next, the controller 21 allows the conveyer 25 to stop the paper conveyance (step S110).

Next, the controller 21 determines whether a validation result of the output object (the image for valid output) is normal (step S111). For example, in a case where the image inspection apparatus 3 sends an analysis result indicating that it is normal or in a case where a recognition result of the user is normal and the user performs an input operation to that effect, the controller 21 determines that the validation result is normal. On the other hand, in a case where the image inspection apparatus 3 sends an analysis result indicating that it is abnormal or in a case where the recognition result of the user is abnormal and the user performs an input operation to that effect, the controller 21 determines that the validation result is not normal.

When it is determined that the validation result of the output object is normal (step S111: YES), the controller 21 proceeds to the next step S112.

On the other hand, when it is determined that the validation result of the output object is not normal (that is, abnormal) (step S111: NO), the controller 21 performs the re-adjustment of a printing parameter (step S113), and then, proceeds to step S102, and repeats again the processing subsequent to step S102.

In step S112, the controller 21 reads the value of the paper conveyance distance counter C1, and stores the value in the storage 26 as the paper cost of the valid output.

Next, an operation at the time of the main printing performed by the image forming system 100 will be described with reference to FIG. 4. The main printing is performed following the valid output (refer to FIG. 3), that is, following the processing of step S112 in FIG. 3.

First, the controller 21 resets the value of the paper conveyance distance counter C1 (set to 0) (step S201).

Next, the controller 21 starts the main printing of the print job (step S202).

Next, the controller 21 allows the conveyer 25 to start the conveyance of the paper (the continuous form paper PM) (step S203).

Next, the controller 21 conveys the paper until the conveyance speed of the paper is stabilized (step S204).

Next, the controller 21 reads the value of the paper conveyance distance counter C1 at a timing when the conveyance speed of the paper is stabilized, and stores the value in the storage 26 as the paper cost of the paper conveyance speed stabilization operation (step S205). The processing of step S205 is the same as the processing of step S105 in FIG. 3, and thus, may be omitted.

Next, the controller 21 allows the image former 23 to perform the adjustment operation (for example, the patch output, the output patch read-in, and the like) (step S206).

Next, the controller 21 reads the value of the paper conveyance distance counter C1 at a timing when the adjustment operation is ended (step S207).

Next, the controller 21 calculates a difference between the values of the paper conveyance distance counter C1 before and after the adjustment operation (that is, a difference between the value read at a timing when the adjustment operation is ended in step S207 and the value read at a timing when the conveyance speed of the paper is stabilized in step S205), and stores the difference in the storage 26 as the paper cost of the adjustment operation (step S208). The processing of step S207 and step S208 is the same as the processing of step S107 and step S108 in FIG. 3, and thus, may be omitted.

Next, the controller 21 allows the image former 23 to perform a forming operation of an image for main printing (step S209).

Next, the controller 21 allows the conveyer 25 to stop the paper conveyance (step S210).

Next, the controller 21 reads the value of the paper conveyance distance counter C1, and stores the value in the storage 26 as the paper cost of the main printing (step S211).

Next, the controller 21 notifies the paper cost stored in the storage 26 to the user (step S212). That is, the controller 21 notifies the paper cost that is managed for each factor to the user. For example, the controller 21 notifies the paper cost of the valid output, the paper cost of the main printing, the paper cost of the paper conveyance speed stabilization operation, the paper cost of the adjustment operation, and the like, which are stored in the storage 26, to the user. Examples of a method for notifying the user include a method for displaying on the display 22*a*, a method for outputting a sound from a sound output, and the like.

In the related art, in the case of predicting/estimating the cost of a job or in the case of considering a cost reduction due to a change in a workflow, it is not possible to grasp elements such as how many print stops/restarts according to adjustment printing is required for the job (the printing companies manage how much image quality is required for each job, and the number of adjustment prints tends to increase for a job requiring strict image quality or a job using paper that is difficult to adjust. Since the check of the image quality and the parameter adjustment are performed between the adjustment prints, it is necessary to temporarily stop the printing), and how many troubles (JAM/waste/consumable item resupply) occur during the printing, and thus, there is a problem that it is not possible to perform consideration with a high accuracy in light of the actual situation.

Figure 4:
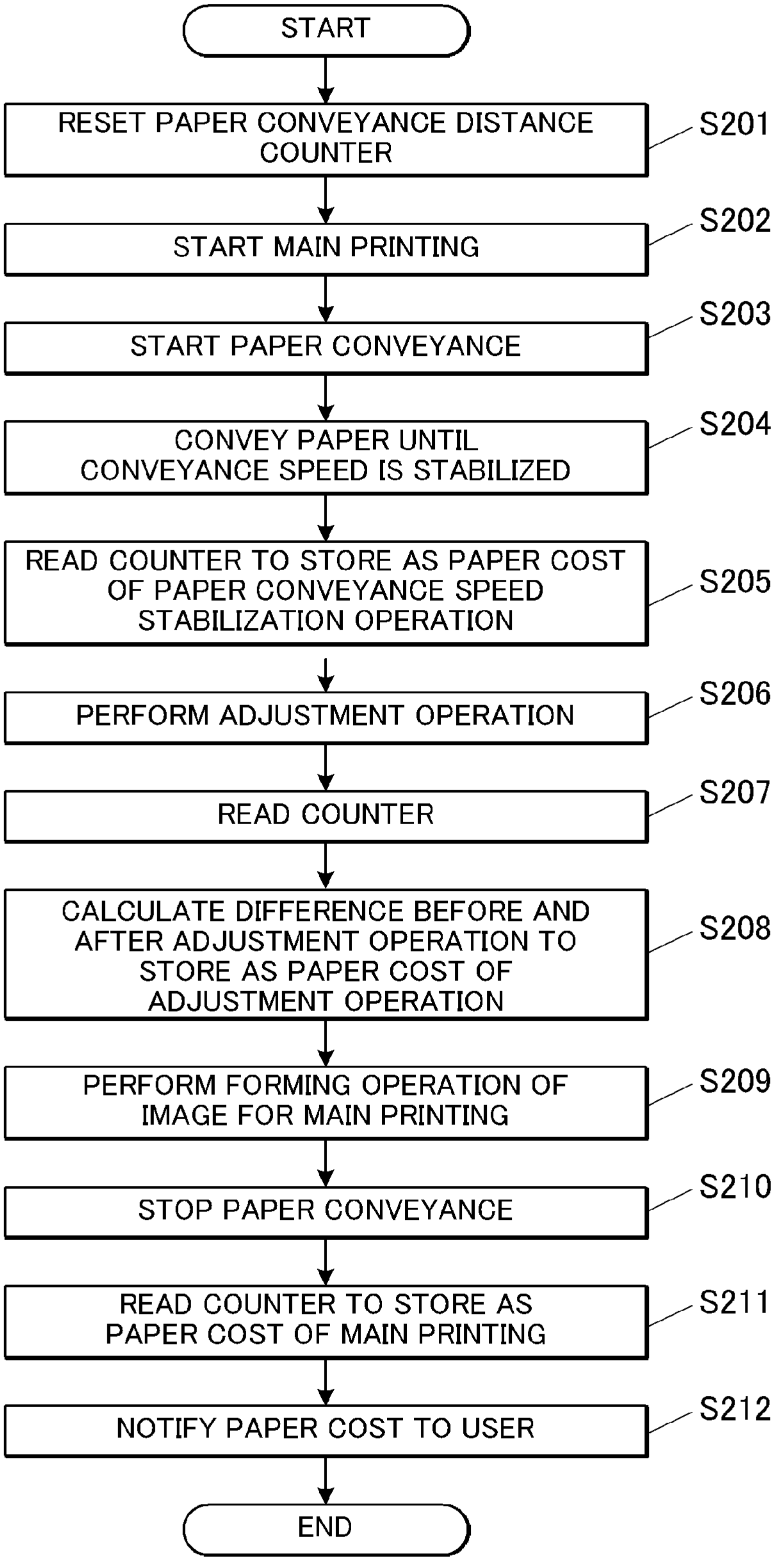
FIG. 4 is a flowchart illustrating an operation at the time of main printing performed by the image forming system according to this embodiment.

Regarding the problem described above, in this embodiment, as described above, the controller 21 calculates the paper cost for the print job of the continuous form paper PM, on the basis of the distance of the continuous form paper PM conveyed from the start (the start of the valid output: refer to step S102 in FIG. 3) to the end (the stop of the paper conveyance after forming the image for main printing: refer to step S210 in FIG. 4) of the print job. That is, the controller 21 includes the paper conveyance other than when an image is formed by the image former 23 (for example, the paper conveyance speed stabilization operation, the adjustment operation, and the like) in the paper cost for the print job of the continuous form paper PM and manages the paper conveyance. Then, the controller 21 manages the paper cost for the print job of the continuous form paper PM for each factor (for example, the adjustment operation, the valid output, the main printing, the paper conveyance speed stabilization operation, and the like).

Accordingly, it is possible to perform consideration with a high accuracy in light of the actual situation.

As described above, the image forming apparatus 2 according to this embodiment includes the image former 23 that forms an image on the continuous form paper PM, and the controller 21 that calculates the paper cost for the print job of the continuous form paper PM, on the basis of the distance of the continuous form paper PM conveyed from the start to the end of the print job.

Therefore, according to the image forming apparatus 2 of this embodiment, it is possible to consider the cost of the paper that is consumed until the feeding speed is stabilized or the paper that is consumed not in the job printing, such as the adjustment, in the roll paper printing, and thus, it is possible to grasp an accurate job printing cost including the entire workflow.

In addition, according to the image forming apparatus 2 of this embodiment, the controller 21 includes the paper conveyance other than when an image is formed by the image former 23 in the paper cost for the print job of the continuous form paper PM and manages the paper conveyance.

Therefore, according to the image forming apparatus 2 of this embodiment, it is possible to consider the cost of the paper that is consumed until the feeding speed is stabilized or the paper that is consumed not in the job printing, such as the adjustment, in the roll paper printing, and thus, it is possible to grasp an accurate job printing cost including the entire workflow.

In addition, according to the image forming apparatus 2 of this embodiment, the controller 21 manages the paper cost for the print job of the continuous form paper PM for each factor. The factor, for example, includes the adjustment operation, the valid output, the main printing, the paper conveyance speed stabilization operation, and the like.

Therefore, according to the image forming apparatus 2 of this embodiment, it is possible for the user to grasp the actual situation of the paper cost in detail, and thus, it is possible to facilitate the cost management, the cost estimation for a new job, or the like.

In addition, according to the image forming apparatus 2 of this embodiment, the controller 21 notifies the paper cost for the print job of the continuous form paper PM, which is managed for each factor, to the user.

Therefore, according to the image forming apparatus 2 of this embodiment, it is possible to provide a means that enables the user to grasp the actual situation of the paper cost in detail, and thus, it is possible for the user to grasp the actual situation of the paper cost in detail, and it is possible to facilitate the cost management, the cost estimation for a new job, or the like.

As described above, the present invention has been described in detail on the basis of the embodiment according to the present invention, but the present invention is not limited to the embodiment described above, and can be modified within a range not departing from the gist thereof.

For example, in the embodiment described above, the adjustment operation, the valid output, the main printing, and the paper conveyance speed stabilization operation have been described as an example of the factor when managing the paper cost for each factor, but the present invention is not limited thereto. For example, other examples of the factor may include the consumable item resupply, the JAM recovery, and the like.

Figure 5:
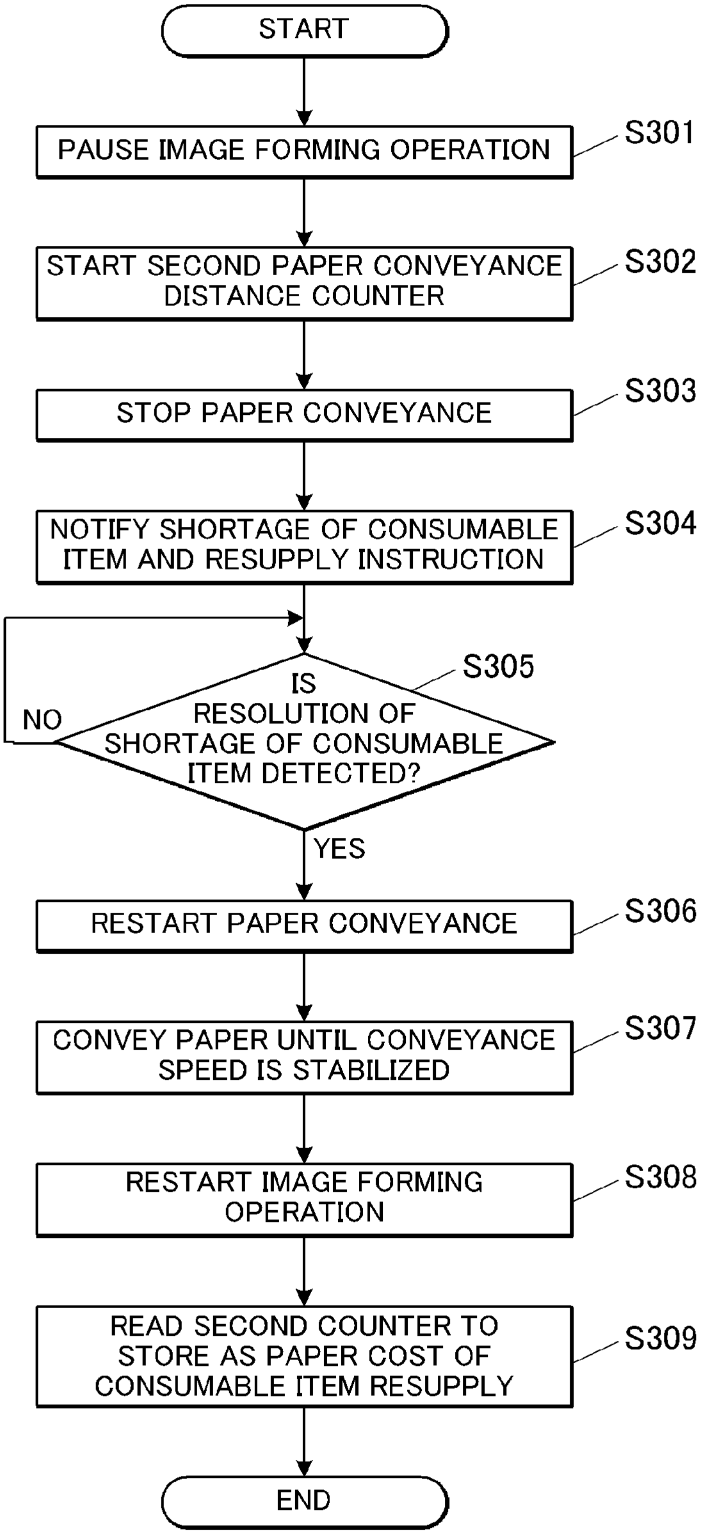
FIG. 5 is a flowchart illustrating an operation at the time of consumable item resupply performed by an image forming system according to Modification Example.

First, an operation at the time of the consumable item resupply that is performed by the image forming system 100 will be described with reference to FIG. 5. This operation is started in a case where the shortage of the consumable item is detected by the consumable item residue sensor SE1 at the time of the forming operation of the image for main printing (or the image for valid output), at the time of the adjustment operation (a forming operation of the patch image), or the like.

First, the controller 21 pauses the image forming operation (step S301).

Next, the controller 21 starts the second paper conveyance distance counter C2 (step S302).

Next, the controller 21 allows the conveyer 25 to stop the conveyance of the paper (the continuous form paper PM) (step S303).

Next, the controller 21 notifies information of the shortage of the consumable item and a resupply instruction for the consumable item to the user (step S304).

Next, the controller 21 determines whether the user resupplies the consumable item and the consumable item residue sensor SE1 detects the resolution of the shortage of the consumable item (step S305).

In a case where the consumable item residue sensor SE1 detects the resolution of the shortage of the consumable item (step S305: YES), the controller 21 proceeds to step S306.

On the other hand, in a case where the consumable item residue sensor SE1 does not detect the resolution of the shortage of the consumable item (step S305: NO), the controller 21 repeats the processing of step S305 until the resolution of the shortage of the consumable item is detected.

Next, the controller 21 allows the conveyer 25 to restart the paper conveyance (step S306).

Next, the controller 21 conveys the paper until the conveyance speed of the paper is stabilized (step S307).

Next, the controller 21 restarts the image forming operation (step S308).

Next, the controller 21 stops the second paper conveyance distance counter C2, reads the value, and stores the value in the storage 26 as the paper cost of the consumable item resupply (step S309).

As described above, the consumable item resupply can be included as the factor when managing the paper cost for each factor.

In Modification Example described above, the second paper conveyance distance counter C2 is started in step S302, and the value of the second paper conveyance distance counter C2 is read in step S309, but the present invention is not limited thereto. For example, the value of the paper conveyance distance counter C1 may be read in step S302, the value of the paper conveyance distance counter C1 may be read again in step S309, and a difference from the value read in step S302 may be calculated. In this case, a configuration can be obtained in which the second paper conveyance distance counter C2 is not provided.

Figure 6:
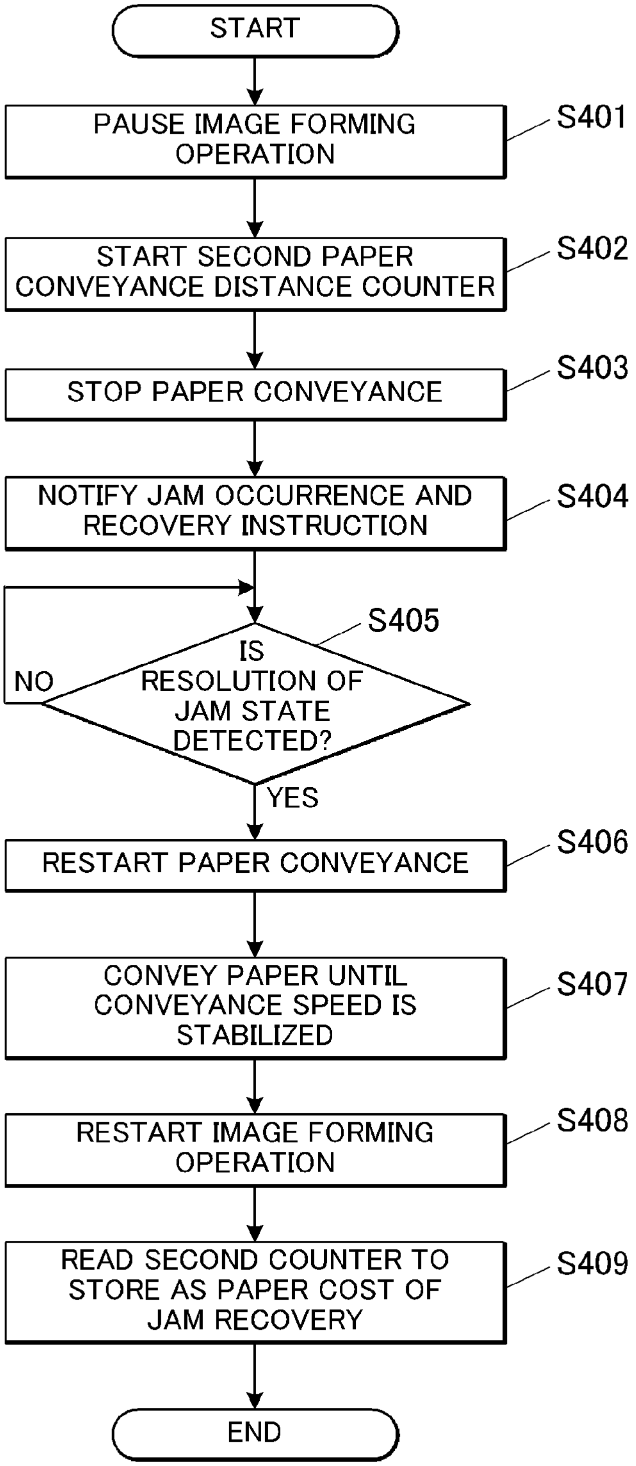
FIG. 6 is a flowchart illustrating an operation at the time of JAM recovery performed by the image forming system according to Modification Example.

Next, an operation at the time of the JAM recovery that is performed by the image forming system 100 will be described with reference to FIG. 6. This operation is started in a case where the JAM detection sensor SE2 detects the occurrence of JAM at the time of the forming operation of the image for main printing (or the image for valid output), at the time of the adjustment operation (the forming operation of the patch image), or the like.

First, the controller 21 pauses the image forming operation (step S401).

Next, the controller 21 starts the second paper conveyance distance counter C2 (step S402).

Next, the controller 21 allows the conveyer 25 to stop the conveyance of the paper (the continuous form paper PM) (step S403).

Next, the controller 21 notifies information of the JAM occurrence and a recovery instruction for JAM to the user (step S404).

Next, the controller 21 determines whether the user performs the recovery of JAM and the JAM detection sensor SE2 detects the resolution of a JAM state (step S405).

In a case where the JAM detection sensor SE2 detects the resolution of the JAM state (step S405: YES), the controller 21 proceeds to step S406.

On the other hand, in a case where the JAM detection sensor SE2 does not detect the resolution of the JAM state (step S405: NO), the controller 21 repeats the processing of step S405 until the resolution of the JAM state is detected.

Next, the controller 21 allows the conveyer 25 to restart the paper conveyance (step S406).

Next, the controller 21 conveys the paper until the conveyance speed of the paper is stabilized (step S407).

Next, the controller 21 restarts the image forming operation (step S408).

Next, the controller 21 stops the second paper conveyance distance counter C2, reads the value, and stores the value in the storage 26 as the paper cost of the JAM recovery (step S409).

As described above, the JAM recovery can be included as the factor when managing the paper cost for each factor.

The value of the paper conveyance distance counter C1 may be read in step S402, the value of the paper conveyance distance counter C1 may be read again in step S409, and a difference from the value read in step S402 may be calculated. In this case, a configuration can be obtained in which the second paper conveyance distance counter C2 is not provided.

In addition, in the embodiment described above, a configuration in which the image inspection apparatus 3 is provided in the subsequent stage of the image forming apparatus 2 is described as an example, but the present invention is not limited thereto. For example, instead of providing the image inspection apparatus 3, an image reader may be provided inside the image forming apparatus 2 (on a downstream from the image former 23), a read result of the image reader (read image data) may be output to the controller 21, and the read result may be analyzed in the controller 21 such that a waste is detected.

In addition, the detailed configuration and the detailed operation of each apparatus configuring the image forming system can be suitably modified within a range not departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming apparatus, comprising:
- an image former that forms an image on continuous form paper; and
- a hardware processor configured to:
  - calculate a paper cost for a print job of the continuous form paper, on the basis of a distance of the continuous form paper conveyed from a start of the print job to an end of the print job;
  - manage the paper cost for the print job of the continuous form paper for each factor, the factors include an adjustment operation, valid output, main printing, and a paper conveyance speed stabilization operation; and
  - notify the paper cost for the print job of the continuous form paper, which is managed for each factor, to a user.

2. The image forming apparatus according to claim 1, wherein the factors include consumable item resupply.

3. The image forming apparatus according to claim 1, wherein the factors include JAM recovery.

4. The image forming apparatus according to claim 1, further comprising:
- a first paper conveyance distance counter and a second paper conveyance distance counter, and wherein the second paper conveyance distance counter is a counter that measure a conveyance distance of the continuous form paper, separately from the first paper conveyance distance counter, and further providing limitations directed to the utilization of the first and second paper conveyance distance counters.

5. A cost calculation method of an image forming apparatus including an image former that forms an image on continuous form paper, the method comprising:
- allowing a hardware processor to;
  - calculate a paper cost for a print job of the continuous form paper, on the basis of a distance of the continuous form paper conveyed from a start of the print job to an end of the print job;
  - manage the paper cost for the print job of the continuous form paper for each factor, the factors include an adjustment operation, valid output, main printing, and a paper conveyance speed stabilization operation; and
  - notify the paper cost for the print job of the continuous form paper, which is managed for each factor, to a user.

6. The cost calculation method according to claim 5, wherein the factors include consumable item resupply.

7. The cost calculation method according to claim 5, wherein the factors include JAM recovery.

8. The cost calculation method according to claim 5, further comprising:
- a first paper conveyance distance counter and a second paper conveyance distance counter, and wherein the second paper conveyance distance counter is a counter that measure a conveyance distance of the continuous form paper, separately from the first paper conveyance distance counter, and further providing limitations directed to the utilization of the first and second paper conveyance distance counters.

9. A non-transitory recording medium storing a computer readable program for allowing a computer of an image forming apparatus including an image former that forms an image on continuous form paper to:
- calculate a paper cost for a print job of the continuous form paper, on the basis of a distance of the continuous form paper conveyed from a start of the print job to an end of the print job;
- manage the paper cost for the print job of the continuous form paper for each factor, the factors include an adjustment operation, valid output, main printing, and a paper conveyance speed stabilization operation; and
- notify the paper cost for the print job of the continuous form paper, which is managed for each factor, to a user.

10. The non-transitory recording medium according to claim 9, wherein the factors include consumable item resupply.

11. The non-transitory recording medium according to claim 9, wherein the factors include JAM recovery.

12. The non-transitory recording medium according to claim 9, further comprising:
- a first paper conveyance distance counter and a second paper conveyance distance counter, and wherein the second paper conveyance distance counter is a counter that measure a conveyance distance of the continuous form paper, separately from the first paper conveyance distance counter, and further providing limitations directed to the utilization of the first and second paper conveyance distance counters.

* * * * *